US012580661B2

(12) United States Patent
Bigongiari et al.

(10) Patent No.: US 12,580,661 B2
(45) Date of Patent: Mar. 17, 2026

(54) COMMUNICATION NETWORK OPTICAL APPARATUS AND METHOD OF PROVIDING AN OPTICAL SIGNAL

(71) Applicant: Telefonaktiebolaget LM Ericsson (publ), Stockholm (SE)

(72) Inventors: Alessandra Bigongiari, Pisa (IT); Stefano Stracca, Pisa (IT); Mats Johansson, Älvsjö (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 240 days.

(21) Appl. No.: 18/290,856

(22) PCT Filed: Aug. 2, 2021

(86) PCT No.: PCT/EP2021/071573
§ 371 (c)(1),
(2) Date: Jan. 22, 2024

(87) PCT Pub. No.: WO2023/011699
PCT Pub. Date: Feb. 9, 2023

(65) Prior Publication Data
US 2024/0259106 A1    Aug. 1, 2024

(51) Int. Cl.
*H04B 10/564* (2013.01)
*H01S 3/04* (2006.01)
*H04B 10/50* (2013.01)

(52) U.S. Cl.
CPC ............. *H04B 10/564* (2013.01); *H01S 3/04* (2013.01); *H04B 10/505* (2013.01)

(58) Field of Classification Search
CPC ............................ H04B 10/564; H04B 10/505
(Continued)

(56) References Cited

U.S. PATENT DOCUMENTS 10,014,943 B2 7/2018 Testa et al.
2008/0304830 A1* 12/2008 Huang ................ H04J 14/0282
398/79

(Continued)

OTHER PUBLICATIONS

"3.2 Tb/s Copackaged Optics Optical Module Product Requirements Document", CPO Optical Module Product Requirements Document, Version 1.0, Feb. 5, 2021, pp. 1-28.
(Continued)

*Primary Examiner* — Quan Zhen Wang
(74) *Attorney, Agent, or Firm* — Sage Patent Group

(57) ABSTRACT

Communications network optical apparatus (100) comprising an optical module (120) and a controller (140). The optical module (120) comprises optical modulators (122), internal lasers (124) to generate internal optical signals, an input port (126) to receive an external optical signal from an external laser, optical routing devices (128) to route internal optical signals from internal lasers to optical modulators and to route an external optical signal from the input port to at least one of the optical modulators, and a temperature sensor (130) to sense a temperature of the internal lasers and to generate a temperature reporting signal. The controller (140) comprises processing circuitry (142) and memory (144) containing instructions which when executed by the processing circuitry cause the controller to perform operations including receiving the temperature reporting signal, determining that a thermal protection condition exists based on the temperature of the internal lasers, and in response to the determining, generating control signals configured to cause the external optical signal to be provided to at least one optical modulator and to cause an operating power of at least one respective internal laser to be reduced.

18 Claims, 16 Drawing Sheets

(58) Field of Classification Search

USPC .......................................................... 398/135

See application file for complete search history.

(56) References Cited

U.S. PATENT DOCUMENTS

| | | | | | |
|---|---|---|---|---|---|
| 2014/0376579 | A1* | 12/2014 | Wach | .................... | H01S 5/0683 |
| | | | | | 372/34 |
| 2017/0207596 | A1* | 7/2017 | Zhang | .................. | H04B 10/541 |
| 2018/0183513 | A1 | 6/2018 | Levesque et al. | | |
| 2020/0162153 | A1* | 5/2020 | Xu | .......................... | H04B 10/40 |
| 2021/0152251 | A1* | 5/2021 | Moon | .................. | H04B 10/506 |

OTHER PUBLICATIONS

"Co-packaged Optics External Laser Source Guidance Document", CPO ELS Guidance Document, V1.0, Jan. 12, 2020, pp. 1-23.

"Ericsson Mobility Report", ericsson.com/mobility-report, Nov. 2020, pp. 1-36.

"Intel combines optics to its Totino 2 switch chip", gazzetabyte, telecom datacom, Mar. 19, 2020, pp. 1-10.

"Urban Wireless Solutions, Connecting the Modern Urbanite", Ericsson.com, 2019, pp. 1-8.

Auer, Gunther, et al., "How Much Energy is Needed to Run a Wireless Network?", Technologies for Green Radio Communication Networks, IEEE Wireless Communications, Oct. 2011, pp. 40-49.

Buscaino, Brandon, et al., "External vs. Integrated Light Sources for Intra-Data Center Co-Packaged Optical Interfaces", Journal of Lightwave Technology, Vo. 39, No. 7, Apr. 1, 2021, pp. 1984-1995.

Enright, Ryan, et al., "A Vision for Thermally Inegrated Photonics Systems", Alcatel-Lucent, Bell Labs Technical Journal, vol. 19, 2014, pp. 31-45.

Enright, R., et al., "Integrated Thermoelectric Cooling for Silicon Photonics", JSS Focus Issue on Thermoelectric Materials and Devices, ECS Journal of Solid State Science and Technology, vol. 6, No. 3, 2017, pp. N3103-N3112.

Jones, Richard, "Lasers for Co-Packaged Optics", OIF Webinar—"Co-packaged Optics—Why, What and How", Oct. 14, 2020, pp. 1-11.

Tombaz, Sibel, et al., "Energy Performance of 5G-NX Wireless Access Utilizing Massive Beamforming and an Ultra-lean System Design", IEEE, 2015, pp. 1-7.

* cited by examiner

<u>Fig. 1</u>

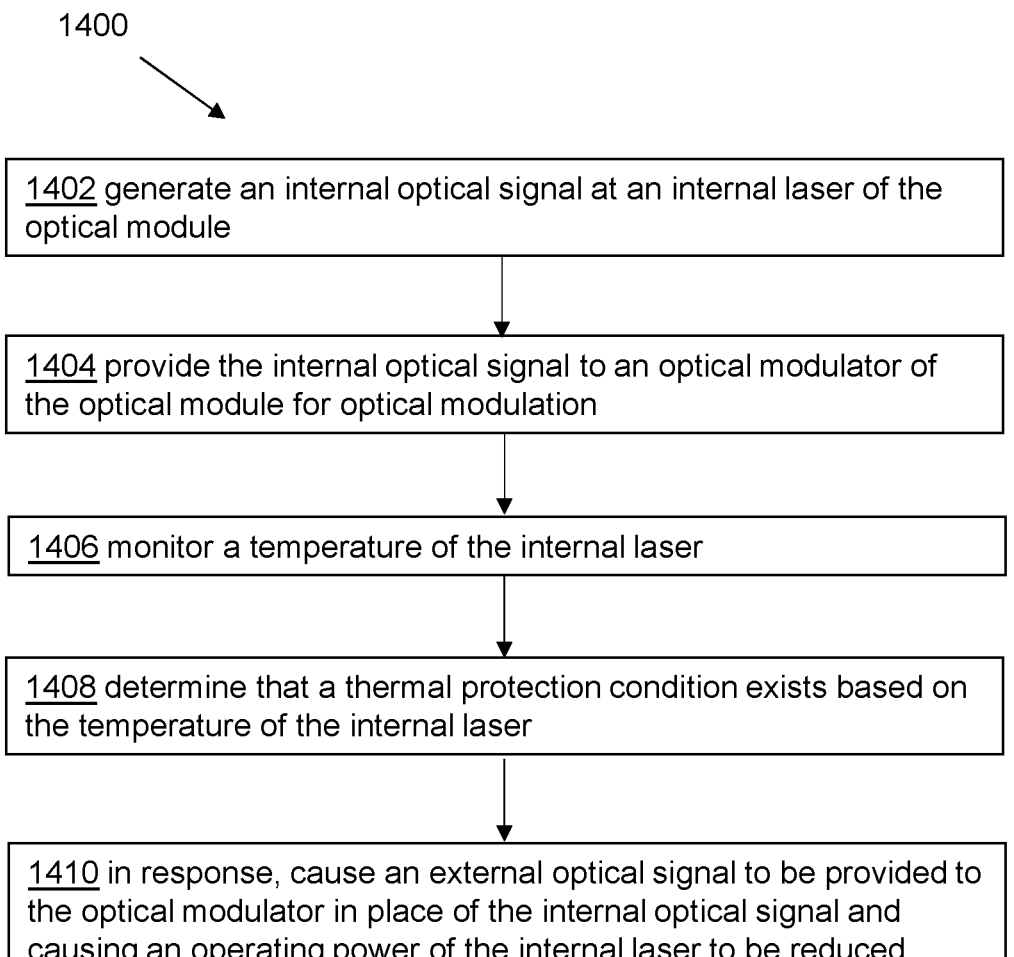

1400

1402 generate an internal optical signal at an internal laser of the optical module 1404 provide the internal optical signal to an optical modulator of the optical module for optical modulation 1406 monitor a temperature of the internal laser 1408 determine that a thermal protection condition exists based on the temperature of the internal laser 1410 in response, cause an external optical signal to be provided to the optical modulator in place of the internal optical signal and causing an operating power of the internal laser to be reduced

Fig. 17

COMMUNICATION NETWORK OPTICAL APPARATUS AND METHOD OF PROVIDING AN OPTICAL SIGNAL

TECHNICAL FIELD

The invention relates to a communications network optical apparatus and to a method of providing optical signals for an optical module in a communications network.

BACKGROUND

Current photonic technologies based on pluggable modules are not suitable for future radio base stations utilising optical communication for intra-system and intra-unit interconnection due to the low energy efficiency and the high frequency dependent channel loss between the transceiver and the ASICs. To make these pluggable modules work at high bit rate (>25 Gbps) very complex, costly, and power-hungry equalization circuits and modulation formats are needed to reduce inter-symbol interference. A new photonic interconnect technology needs be developed with a higher level of integration between photonics and electronics, higher energy efficiency, based on solutions that are compatible with mass production in existing production lines for electronics. This technology relies on a new concept of system in package devices based on multi-chip modules (MCM) including, in the same substrate, digital ASICs and co-packaged optical transceivers with high throughput that are used as ASIC I/O interfaces Co-packaged optics, CPO, has been proposed to reduce the cost of packaging and power consumption by shortening the electrical lines between the optical module and the ASIC. It is estimated that the cost of packaging accounts for the 80% of the total cost of a transceiver according to IPSR 2020. An additional cost reduction comes from the integration of multiple laser sources into a single optical transceiver with multiple channels. Nevertheless, the co-packaged solution presents some drawbacks in terms of serviceability and thermal management of the laser sources.

An integrated laser source dissipates a small thermal load of approximately 100 mW, however, because the lasers are very small in size (typically few hundreds of microns), the device-level heat flux dissipated per laser is large, around 1 kW/cm2. Removing this level of heat flux locally through an acceptable thermal resistance is extremely challenging and this may reduce the level of integration that can be achieved.

Currently, the approach adopted in optical transceivers to address the thermal management of laser sources is the use of solid state thermo-electric cooler, also indicated as macro-TEC. The TEC acts to maintain a reference temperature of the photonic chip and avoids the decay of laser performances during operation. Semiconductor lasers performances depend strongly on temperature. The threshold current of semiconductor lasers increases fast with temperature and their yield generally decreases above 300 K. Additionally, laser lifetime decreases with exposure to high temperature according to the Arrhenius model.

Additionally, the integration of laser sources poses the problem of serviceability; in case of failure of a single laser source the whole module must be replaced since an integrated laser cannot be replaced. This may severely reduce any economic advantage of the co-packaged solution.

Standby/spare lasers have been proposed to address the issue of laser failure in integrated photonic chips e.g. in US 2018/0183513 A1 which describes the replacement of failed lasers with auxiliary lasers that are included on the photonic chip so that when a failure is detected on a working laser the standby/spare laser can take over.

External laser sources have been proposed for CPO as an alternative to integrated laser sources, to address the issue of serviceability and thermal stress in co-packaged modules, as reported in the CPO joint development forum, JDF, guidance document "Co-packaged Optics External Laser Source Guidance Document v1.0": http://www.copackagedoptics-.com/wp-content/uploads/2020/01/ELS-Guidance-Doc-v1.0-FINAL.pdf

SUMMARY

It is an object to provide an improved communications network optical apparatus. It is a further object to provide an improved method of providing optical signals for an optical module in a communications network.

An aspect of the invention provides communications network optical apparatus comprising an optical module and a controller. The optical module comprises optical modulators, internal lasers, an input port, optical routing devices and a temperature sensor. The optical modulators are arranged to modulate optical signals. The internal lasers arranged to generate internal optical signals to be modulated by the optical modulators. The input port is arranged to receive an external optical signal from an external laser. The optical routing devices are arranged to route internal optical signals from internal lasers to optical modulators and to route an external optical signal from the input port to at least one of the optical modulators. The temperature sensor is arranged to sense a temperature of the internal lasers and to generate a temperature reporting signal. The controller comprises processing circuitry and memory containing instructions executable by said processing circuitry whereby said controller is operative to perform operations. The operations include receiving the temperature reporting signal. The operations additionally include determining that a thermal protection condition exists based on the temperature of the internal lasers. The operations additionally include, in response to the determining, generating control signals configured to cause the external optical signal to be provided to at least one optical modulator and to cause an operating power of at least one respective internal laser to be reduced.

The apparatus may enable thermal stress relief for lasers integrated within optical modules where dissipation of heat is particularly difficult by switching from using the internal laser to using an external optical signal when a thermal stress condition occurs. The apparatus may be particularly advantageous for use in applications where internal lasers experience thermal stress for a limited time relative to their total time of operation. The apparatus may enable an optical module to switch to an external optical signal when the optical module's internal lasers are experiencing thermal stress that is limited in space and time, to mitigate the thermal stress experienced by an internal laser. Mitigating the thermal stress in this way may mitigate reduction in the operating lifetime of the internal laser and may mitigate a reduction in the performance of the internal laser. The apparatus may advantageously enable the optical module to operate most of the time with the cost-effective internal lasers and to use an external optical signal from an external laser occasionally, for example when a peak in traffic causes a large temperature increase in the optical module.

In an embodiment, the control signals comprise a first control signal and a second control signal. The first control signal is for providing power control commands to an external laser. The second control signal is for providing power control commands to the at least one internal laser. The controller is caused to generate the first control signal to provide a power-on control command to the external laser in response to the determining that a thermal protection condition exists. The controller is additionally caused to subsequently generate the second control signal to provide at least one power control command configured to cause the operating power of the at least one respective internal laser to be reduced. The apparatus may advantageously enable the external laser to be switched on only when an external optical signal is required. Reducing the internal laser operating power after causing the external laser to switch on may advantageously enable the optical module to alternate the use of an internal laser and an external laser without causing bit errors or performance degradation in the optical module.

In an embodiment, the operating power of the at least one respective internal laser is reduced by switching off the operating power, by gradually reducing the operating power and then switching off the operating power, or by gradually reducing the operating power to zero. The apparatus is thus advantageously able to perform an instantaneous hand-over from the internal laser to the external optical signal or a gradual hand-over.

In an embodiment, the first control signal provides a power-on control command configured to cause the external laser to gradually increase a power of the external optical signal up to an operating power as the operating power of the internal laser is gradually reduced. This may avoid any fluctuation in the optical power received at the optical modulator.

In an embodiment, the optical module further comprises an optical tap configured to route a portion of an external optical signal received at the input port to the at least one respective internal laser for injection locking the at least one internal laser with the external optical signal. The second control signal is generated subsequently to the injection locking. In this way the wavelength of the internal optical signal may be matched to the wavelength of the external optical signal, to within the wavelength tolerance of an optical channel, before the external optical signal takes over from the internal optical signal. Injection locking may also enable the phase of the internal optical signal to be aligned to the phase of the external optical signal before the external optical signal takes over from the internal optical signal. Use of injection locking may avoid optical interference occurring between the internal optical signal and the external optical signal when the internal and external optical signals are coexisting.

In an embodiment, the external optical signal has a first frequency and the internal optical signals have frequencies different to the first frequency by a frequency difference that is greater than a defined detection bandwidth. This may advantageously cause any optical beat signal generated between coexisting internal and external optical signals to be outside a defined detection bandwidth.

In an embodiment, the optical routing devices comprise a first optical waveguide, a second optical waveguide, a third optical waveguide and at least one directional phase-shifting coupler. The first optical waveguide is coupled to an optical modulator. The second optical waveguide is coupled to an internal laser. The third optical waveguide is coupled to the input port. The at least one directional phase-shifting coupler is for coupling the second optical waveguide to the first optical waveguide or the third optical waveguide to the first optical waveguide. The control signals further comprise a third control signal for providing control commands to the at least one directional phase-shifting coupler. The controller is caused to generate the third control signal, after generating the first control signal. The third control signal is configured to provide control commands. The control commands are to cause the at least one directional phase-shifting coupler to couple the internal optical signal into the first optical waveguide with a first phase. The control commands are additionally to cause the at least one directional phase-shifting coupler to stop coupling the internal optical signal into the first optical waveguide. The control commands are additionally to cause the at least one directional phase-shifting coupler to couple the external optical signal into the first optical waveguide with the first phase. This may avoid any fluctuation in the optical power received at the optical modulator. This may also avoid optical interference occurring between the internal optical signal and the external optical signal when the internal and external optical signals are coexisting.

In an embodiment, the third control signal is additionally configured to provide further control commands. The further control commands are to cause the at least one directional phase-shifting coupler to gradually reduce to nothing the coupling of the internal optical signal into the first optical waveguide. The further control commands are additionally to cause the at least one directional phase-shifting coupler to gradually increase the coupling of the external optical signal into the first optical waveguide with the first phase. This may avoid any fluctuation in the optical power received at the optical modulator.

In an embodiment, the optical routing devices comprise an all-optical switch and the optical module further comprises an optical tap. The all-optical switch has a first input connected to an internal laser, a second input connected to the input port and an output connected to an optical modulator. The optical tap is configured to route a portion of an external optical signal received at the input port of the optical module to the all-optical switch as a switching signal for the all-optical switch. The all-optical switch has a first switch condition in which the first input is connected to the output and a second switch condition in which the second input is connected to the output. The all-optical switch is arranged to switch from the first switch condition to the second switch condition responsive to receipt of a said switching signal. An all-optical switch may enable fast switching which may avoid any fluctuation in the optical power received at the optical modulator and may avoid transmission downtime.

In an embodiment, the all-optical switch has a switching time for switching between the first switching condition and the second switching condition. The switching time is less than 10 ps. The all-optical switch may advantageously enable very fast switching, effectively between bits modulated onto the optical signal, which may avoid any fluctuation in the optical power received at the optical modulator, due to interference caused by the coexistence of internal and external optical signals at the same wavelength, and any loss of bits.

In an embodiment, the apparatus further comprises a second optical module and a variable power coupler. The variable power coupler is configured to receive the external optical signal from the external laser and is configured to power split the external optical signal to send a first portion of the external optical signal to the optical module and second portion of the external optical signal to the second optical module. A single external optical signal, provided by a single external laser, may thus be used to provide external optical signals to two optical modules, reducing the cost as compared to providing an external laser for each module.

In an embodiment, the controller is further operative to perform further operations. The further operations include receiving a further temperature reporting signal. The further operations additionally include determining that a thermal protection condition no longer exists based on the temperature of the internal lasers. The further operations additionally include, in response to said determining, generating control signals configured to stop the external optical signal being provided to the at least one optical modulator and to cause the reduction in the operating power of the at least one respective internal laser to be reversed. The apparatus may advantageously return to operation using the internal laser once a thermal stress condition has ended.

In an embodiment, the apparatus comprises a plurality of optical modules and an optical switch apparatus configured to receive external optical signals. The controller is operative to receive temperature reporting signals from the optical modules and to determine that a thermal protection condition exists at an optical module based on the temperature of its internal lasers. The control signals are further configured to cause the optical switch apparatus to route one of the external optical signals to the optical module having said thermal protection condition. The apparatus may reduce the number of external lasers that are necessary to provide external optical signals to protect the internal lasers of an optical module. Also, this may increase the reliability of the apparatus because in case of failure of an external laser source an external optical signal from another external laser source can be used.

In an embodiment, the apparatus further comprise at least one external laser arranged to generate at least one external optical signal.

In an embodiment, the apparatus further comprises a plurality of external lasers arranged to generate the external optical signals. The plurality of external lasers and the optical switch apparatus are located remote from the plurality of optical modules. The apparatus may advantageously enable the optical module to operate most of the time with the cost-effective internal lasers and to use external optical signals from a pool of shared external lasers occasionally, for example when a peak of traffic causes a large temperature increase in the optical module. Also, this may increase the reliability of the apparatus because in case of failure of an external laser another one of the external lasers can be used.

In an embodiment, an optical module is a co-packaged optics, CPO, module. The apparatus may advantageously enable combining the cost-saving of using a CPO optical module with serviceability and reliability with a solution where the external optical signal is used only in the cases where internal lasers are under thermal stress.

In an embodiment, an optical module is provided in a Radio Unit.

Corresponding embodiments and advantages also apply to the method described below.

An aspect of the invention provides a method of providing optical signals for an optical module in a communications network. The method comprises the following steps. A step of generating an internal optical signal at an internal laser of the optical module. A step of providing the internal optical signal to an optical modulator of the optical module for optical modulation. A step of monitoring a temperature of the internal laser. A step of determining that a thermal protection condition exists based on the temperature of the internal laser. A step of, in response to the determining, causing an external optical signal to be provided to the optical modulator and causing an operating power of the internal laser to be reduced.

Embodiments of the invention will now be described, by way of example only, with reference to the accompanying drawings.

BRIEF DESCRIPTION OF THE DRAWINGS

FIG. 17 is a flowchart illustrating embodiments of method steps.

DETAILED DESCRIPTION

The same reference numbers will be used for corresponding features in different embodiments.

Figure 1:
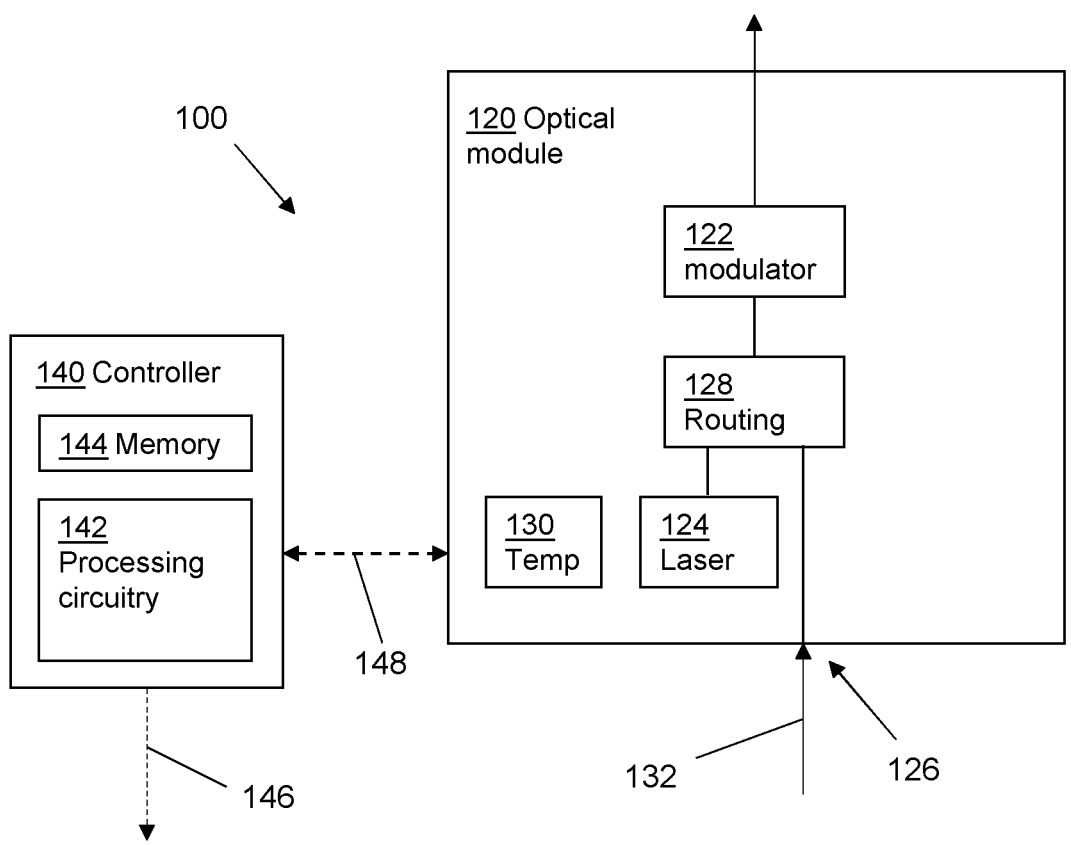
FIGS. 1 to 13 and 16 are block diagrams illustrating embodiments of communications network optical apparatus.

Referring to FIG. 1, an embodiment provides communications network optical apparatus 100 comprising an optical module 120 and a controller 140.

The optical module 120 comprises optical modulators 122, internal lasers 124, an input port 126, optical routing devices 128 and a temperature sensor 130.

The optical modulators are arranged to modulate optical signals. The internal lasers are arranged to generate internal optical signals to be modulated by the optical modulators. The temperature sensor is arranged to sense a temperature of the internal lasers and to generate a temperature reporting signal.

The input port is arranged to receive an external optical signal 132 from an external laser. The optical routing devices are arranged to route internal optical signals from internal lasers to optical modulators and to route an external optical signal from the input port to at least one of the optical modulators.

The controller comprises processing circuitry 142 and memory 144 containing instructions which when executed by the processing circuitry cause the controller to perform operations including:

receiving the temperature reporting signal;

determining that a thermal protection condition exists based on the temperature of the internal lasers; and in response to determining that a thermal protection condition exists, generating control signals 146, 148 configured to cause the external optical signal to be provided to at least one optical modulator and to cause an operating power of at least one respective internal laser to be reduced.

In an embodiment, the control signals comprise a first control signal 146 for providing power control commands to an external laser and a second control signal 148 for providing power control commands to the internal laser.

The controller 140 is caused to generate the first control signal to provide a power-on control command to the external laser in response to determining that a thermal protection condition exists. The controller is also caused to subsequently generate the second control signal, after generating the first control signal, to provide at least one power control command configured to cause the operating power of the internal laser to be reduced.

The handover of the light input from the internal laser to the external optical signal is performed in a way that the optical power input to the optical modulator is maintained.

In an embodiment, the operating power of the internal laser is reduced by switching off the operating power. In an alternative embodiment, the operating power of the internal laser is reduced by gradually reducing the operating power and then switching off the operating power. In an alternative embodiment, the operating power of the internal laser is reduced by gradually reducing the operating power to zero.

Figure 2:
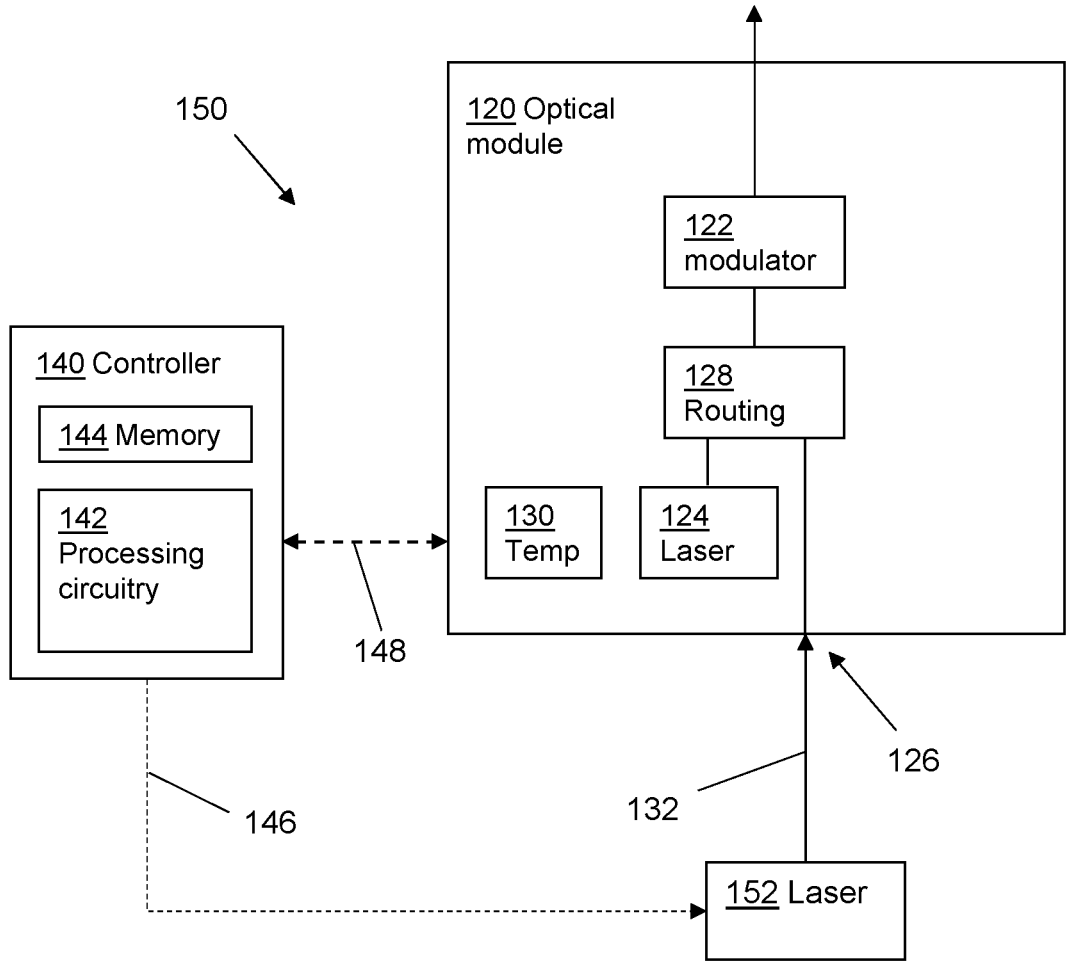

In an embodiment, illustrated in FIG. 2, the communications network optical apparatus 150 further comprises an external laser 152 arranged to generate the external optical signal 132.

Figure 3:
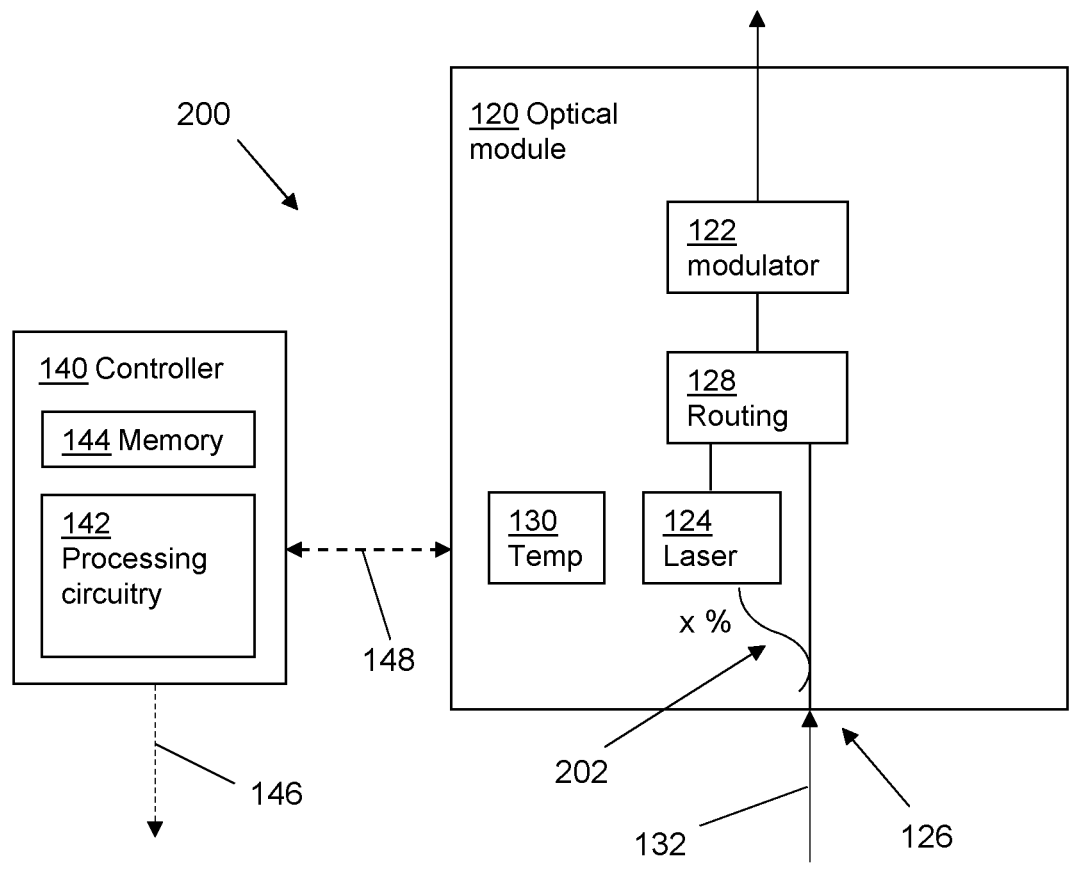

An embodiment provides communications network optical apparatus 200 as illustrated in FIG. 3.

In this embodiment the optical module additionally comprises an optical tap 202. The optical tap is configured to route a portion of an external optical signal 132 received at the input port 126 to the internal laser 124. The portion of the external optical signal is used to injection lock the internal laser with the external optical signal.

The second control signal is generated subsequently to the injection locking, to provide at least one power control command configured to cause the operating power of the internal laser to be reduced after it has been injection locked with the external optical signal.

Since the internal optical signal and the external optical signal co-exist during handover, it is necessary to avoid the generation of interference or beat signal. This can be achieved by ensuring the overlap of the two inputs, in terms of frequency and phase, by injection locking.

Injection locking enables high spectral overlap to be achieved between the external optical signal and the internal optical signal. The internal laser 124 (the 'slave' laser) is tuned to the frequency of the external optical signal by injecting a small amount of the external optical signal into the resonant cavity of the internal laser.

Additional controls may also be used to find the best alignment of the phase of the external optical signal and the phase of the internal laser. Phase alignment is relevant only in the case where the frequency of the external optical signal and the frequency of the internal optical signal are set to be the substantially the same (i.e. to have a high percentage of spectral overlap), means that interference may occur if the phases are not aligned.

In an embodiment, the external optical signal 132 has a first frequency and the internal optical signals have frequencies different to the first frequency. The frequencies of the internal optical signals are different to the first frequency by a frequency difference that is greater than a defined detection bandwidth.

The internal optical signal and the external optical signal co-exist during handover, setting this frequency means that any beat signal is generated between the internal and external optical signals does not fall within a defined detection bandwidth, so it is not detected by a receiver. Controlling the frequencies may be easier to implement and more robust than phase control, however it may be less suitable for use in a dense wavelength division multiplexing, DWDM, system since it would necessarily increase the bandwidth required by each channel. It may be easily adopted in 'gray optics' systems used in interconnect/data centers or course WDM, CWDM, systems.

Figure 4:
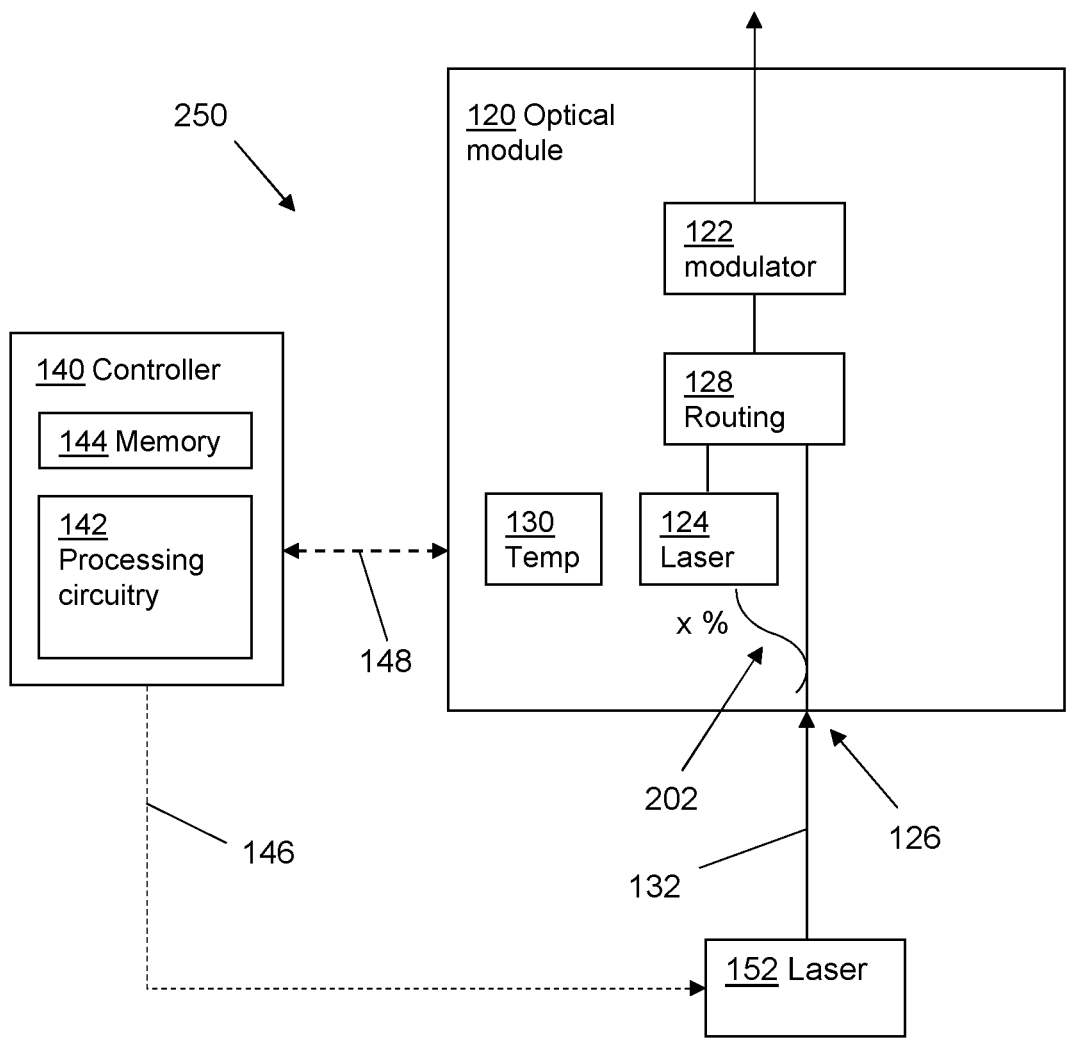

In an embodiment, illustrated in FIG. 4, the communications network optical apparatus 250 further comprises an external laser 152 arranged to generate the external optical signal 132.

Figures 5, 6:
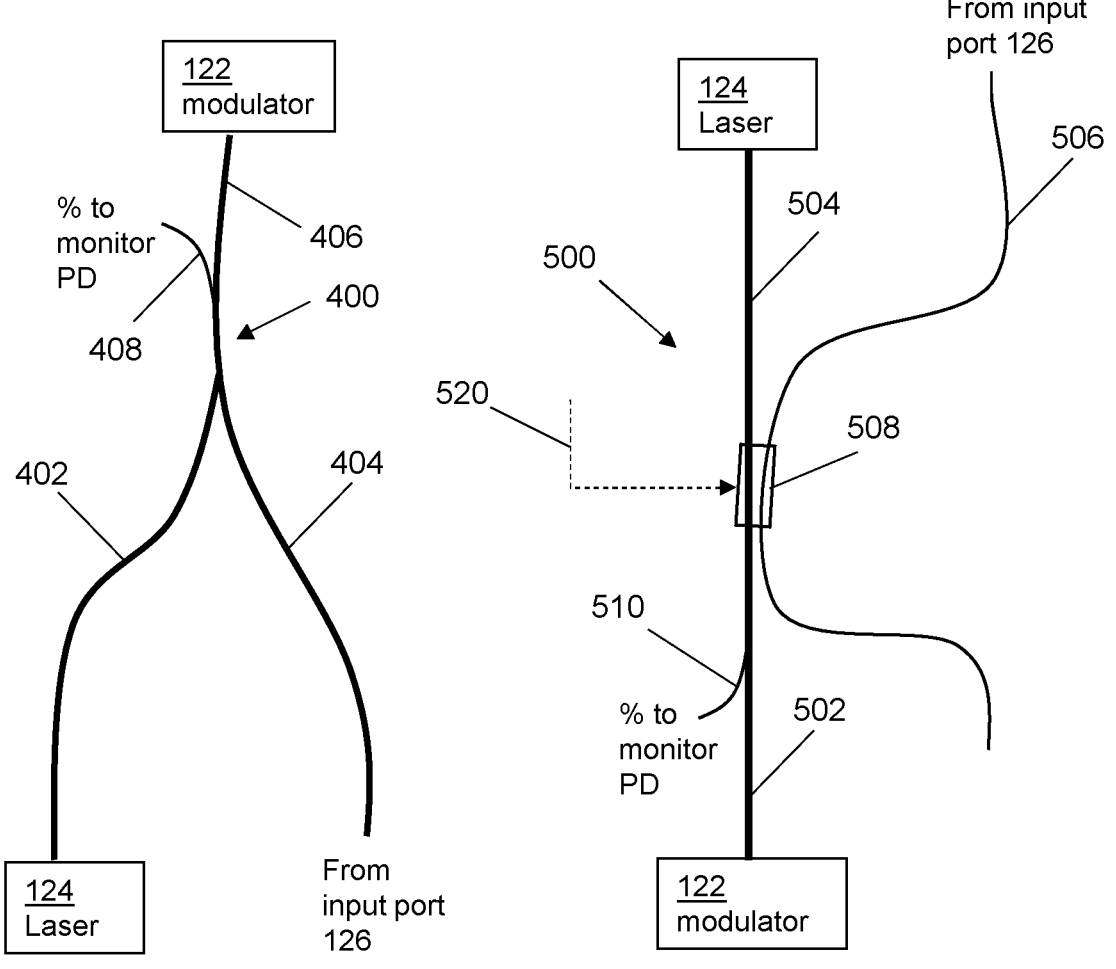
Figure 7:
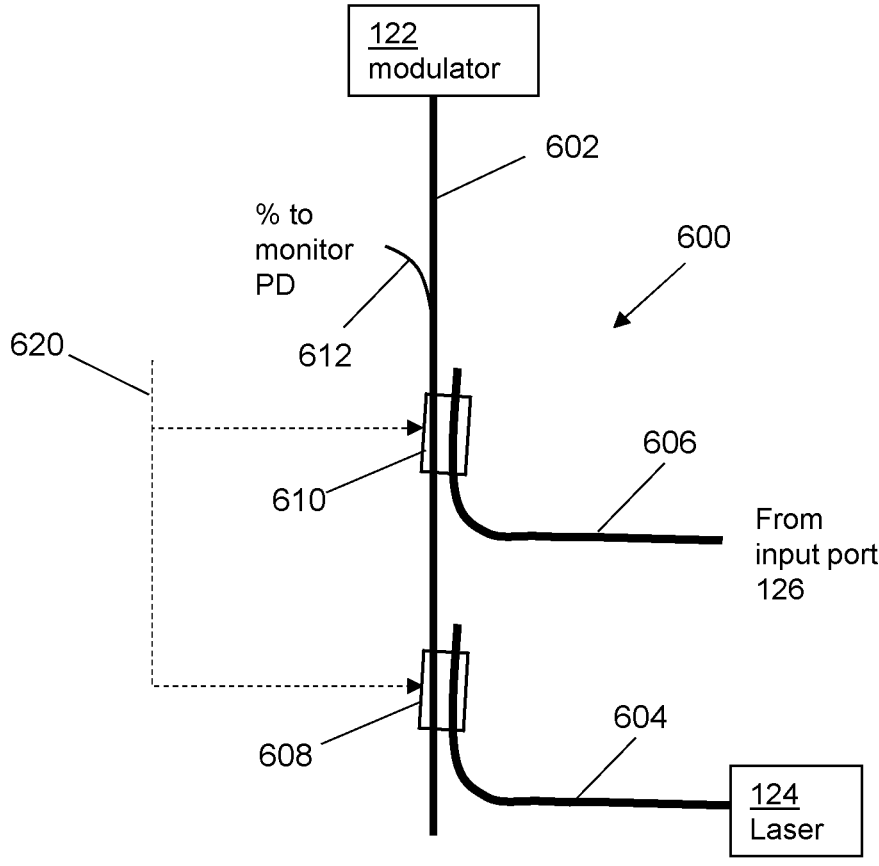

FIGS. 5 to 7 illustrate embodiments 400, 500, 600 of the optical routing device 128. Each embodiment supports gradual handover from the internal laser 124 to the external optical signal 132, and vice versa, to maintain the optical power output of the optical module 120. Each optical routing device couples the internal optical signal and the external optical signal into a common waveguide 406, 504, 602 that in turn feeds an optical modulator 122 in the optical module.

In the embodiment of FIG. 5, the optical routing device 400 is a passive power coupler, such as a Y-branch coupler. A first input branch 402 is coupled to the internal laser 124, a second input branch 404 is coupled to the input port 126, to receive the external optical signal 132, and a common output branch 406 is coupled to the optical modulator 122. An optical tap 408 is also provided to deliver a small percentage of the output light to a monitor photodiode, PD, not shown.

The monitor photodiode will detect an increase in output optical power when the external optical signal is present and output a photodiode signal to the controller 140. The controller 140 is operable, in response to receiving a photodiode signal indicating an increase in output optical power, to generate the second control signal 148 to provide at least one power control command configured to cause the bias current of the internal laser to be reduced to zero.

Similarly, when the thermal protection condition has ended and the internal laser takes over again from the external optical signal, the photodiode signal may be used to cause the controller 140 to generate a first control signal 146 comprising power control commands to drive the gradual shut down of the external laser providing the external optical signal.

In the embodiment of FIG. 6, the optical routing device 500 comprises a first optical waveguide 502, a second optical waveguide 504, a third optical waveguide 506 and a directional phase-shifting coupler 508.

The first optical waveguide is coupled to the optical modulator 122, the second optical waveguide is coupled to the internal laser 124 and the third optical waveguide is coupled to the input port 126. The directional phase-shifting coupler 508 is configured to couple the second optical waveguide to the first optical waveguide or to couple the third optical waveguide to the first optical waveguide. The directional phase-shifting coupler also includes a phase shifter configured to match the phase of the external optical signal to the phase of the internal optical signal.

The controller 140 is additionally caused to generate a third control signal, after generating the first control signal. The third control signal is for providing control commands to the directional phase-shifting coupler.

The internal laser 124 generates the internal optical signal at a first wavelength (optical frequency) and a first phase. The external optical signal 132 is at the first wavelength and a second phase, which will in general be different to the first phase.

The third control signal is configured to provide control commands to:

cause the directional phase-shifting coupler to couple the internal optical signal into the first optical waveguide;

cause the directional phase-shifting coupler to stop coupling the internal optical signal into the first optical waveguide; and cause the directional phase-shifting coupler to apply a phase-shift to the external optical signal so that its phase is the same as the internal optical signal (i.e. the first phase) and to couple the phase matched external optical signal into the first optical waveguide.

The optical routing device 500 can be used to avoid destructive interference between the internal and external optical signals during handover from the internal optical signal to the external optical signal, and back.

In an alternative embodiment, the optical routing device 500 comprises a passive directional coupler, configured to transfer 100% of the external optical signal into the first waveguide 502.

Using a passive directional coupler, destructive interference of internal and external optical signals during handover can be addressed by managing the wavelengths of external and internal optical signals.

In an embodiment, the control commands cause the directional phase-shifting coupler 508 to gradually reduce to nothing the coupling of the internal optical signal into the first optical waveguide and gradually increase the coupling of the external optical signal into the first optical waveguide with the first phase. This may enable a consistent optical power to be output from the optical routing device to the optical modulator.

In the embodiment of FIG. 7, the optical routing device 600 comprises a first optical waveguide 602, a second optical waveguide 604, a third optical waveguide 606, a first directional phase-shifting coupler 608 and a second directional phase-shifting coupler 610.

The first optical waveguide is coupled to the optical modulator 122, the second optical waveguide is coupled to the internal laser 124 and the third optical waveguide is coupled to the input port 126. The first directional phase-shifting coupler 608 is configured to couple the second optical waveguide to the first optical waveguide, to couple the internal optical signal into the first optical waveguide. The second directional phase-shifting coupler 610 is configured to couple the third optical waveguide to the first optical waveguide, to couple the external optical signal into the first optical waveguide. The directional phase-shifting couplers also include phase shifters configured to match the phase of the external optical signal to the phase of the internal optical signal.

The controller 140 is additionally caused to generate a third control signal, after generating the first control signal. The third control signal is for providing control commands to the directional phase-shifting couplers. The internal laser 124 generates the internal optical signal at a first wavelength (optical frequency) and a first phase. The external optical signal 132 is at the first wavelength and a second phase, which will in general be different to the first phase. The third control signal is configured to provide control commands to:

cause the first directional phase-shifting coupler 608 to couple the internal optical signal into the first optical waveguide;

cause the first directional phase-shifting coupler to stop coupling the internal optical signal into the first optical waveguide; and cause the second directional phase-shifting coupler 610 to apply a phase-shift to the external optical signal so that its phase is the same as the internal optical signal and to couple the phase matched external optical signal into the first optical waveguide.

In an embodiment, the control commands cause the first directional phase-shifting coupler 608 to gradually reduce to nothing the coupling of the internal optical signal into the first optical waveguide and cause the second directional phase-shifting coupler 610 to gradually increase the coupling of the external optical signal into the first optical waveguide with the first phase. By matching the gradual increase/decrease a consistent optical power may be output from the optical routing device to the optical modulator.

In an embodiment, the third control signal is configured to provide control commands to cause the first directional phase-shifting coupler 608 to apply a phase-shift to the internal optical signal so that has a third phase, different to the first and second phases. The control commands also cause the second directional phase-shifting coupler 610 to apply a phase-shift to the external optical signal so that also has the third phase.

This active control of the phases is the most efficient configuration for the avoidance of destructive interference during handover since it is possible to control both the phase of the internal optical signal and the phase of the external optical signal.

The controller 140 may also be configured to generate a fourth control signal to provide control commands to perform the opposite handover, from external optical signal to internal optical signal, when the thermal protection condition no longer exists at the internal laser 124.

Figure 8:
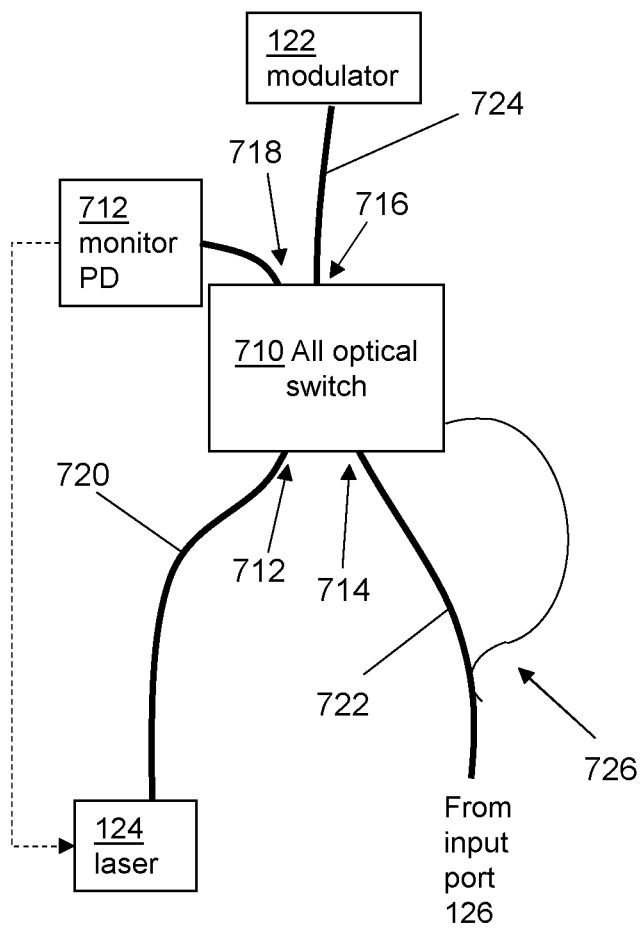

FIG. 8 illustrates an embodiment in which the optical routing device comprises an all-optical switch 710 and the optical module 120 further comprises an optical tap 726.

The all-optical switch 710 has a first input 712 connected to the internal laser 124, a second input 714 connected to the input port 126 and an output 716 connected to the optical modulator 122. The optical tap is configured to route a portion of the external optical signal received at the input port 126 to the all-optical switch as a switching signal for the all-optical switch.

The all-optical switch has a first switch condition in which the first input is connected to the output and a second switch condition in which the second input is connected to the output. The all-optical switch is arranged to switch from the first switch condition to the second switch condition responsive to receipt of a switching signal. The all-optical switch is arranged to switch from the first switch condition to the second switch condition responsive to the switching signal no longer being present.

The all-optical switch 710 enables a 'switched handover' which avoids the need for managing the co-existence of the internal and external optical signals in terms of beat and interference.

In an embodiment, the all-optical switch 710 has a switching time, for switching between the first switching condition and the second switching condition, that is less than 10 ps The switching time is thus small enough to prevent the occurrence of transmission error, i.e. the loss of bits, during handover.

Figure 9:
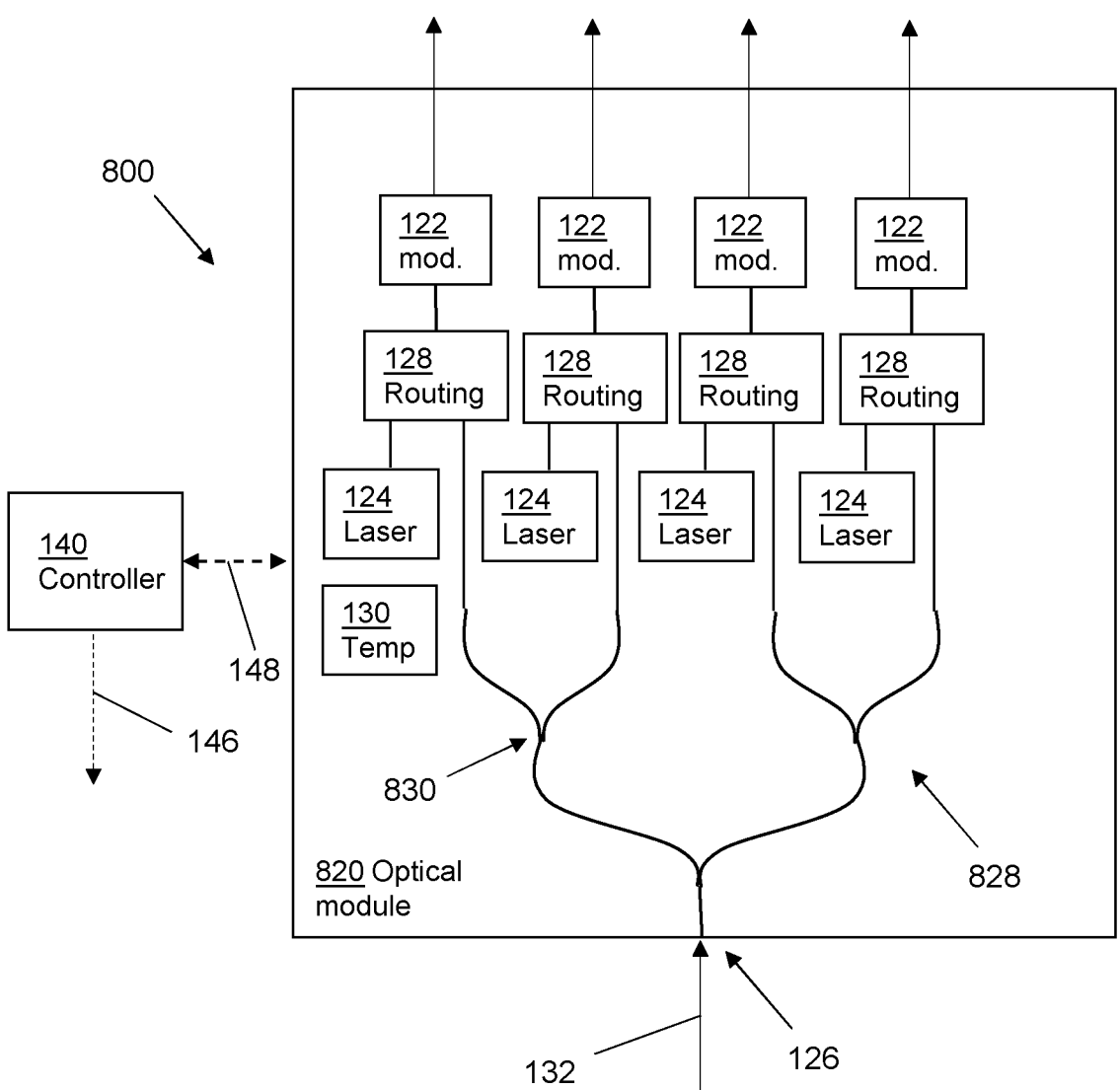

In an embodiment, illustrated in FIG. 9, the optical module 820 of the communications network optical apparatus 800 comprises a plurality of internal lasers 124, optical routing devices 128 and optical modulators 122. The optical module 820 also comprises three passive Y-branch couplers 822, 824, 826 provided between the input port 126 and the optical routing devices 128, arranged to power split the external optical signal 132 received at the input port into four external optical signals. The external optical signal 132 can therefore be used to replace one or more of the respective internal optical signals generated by the internal lasers 124.

Figure 10:
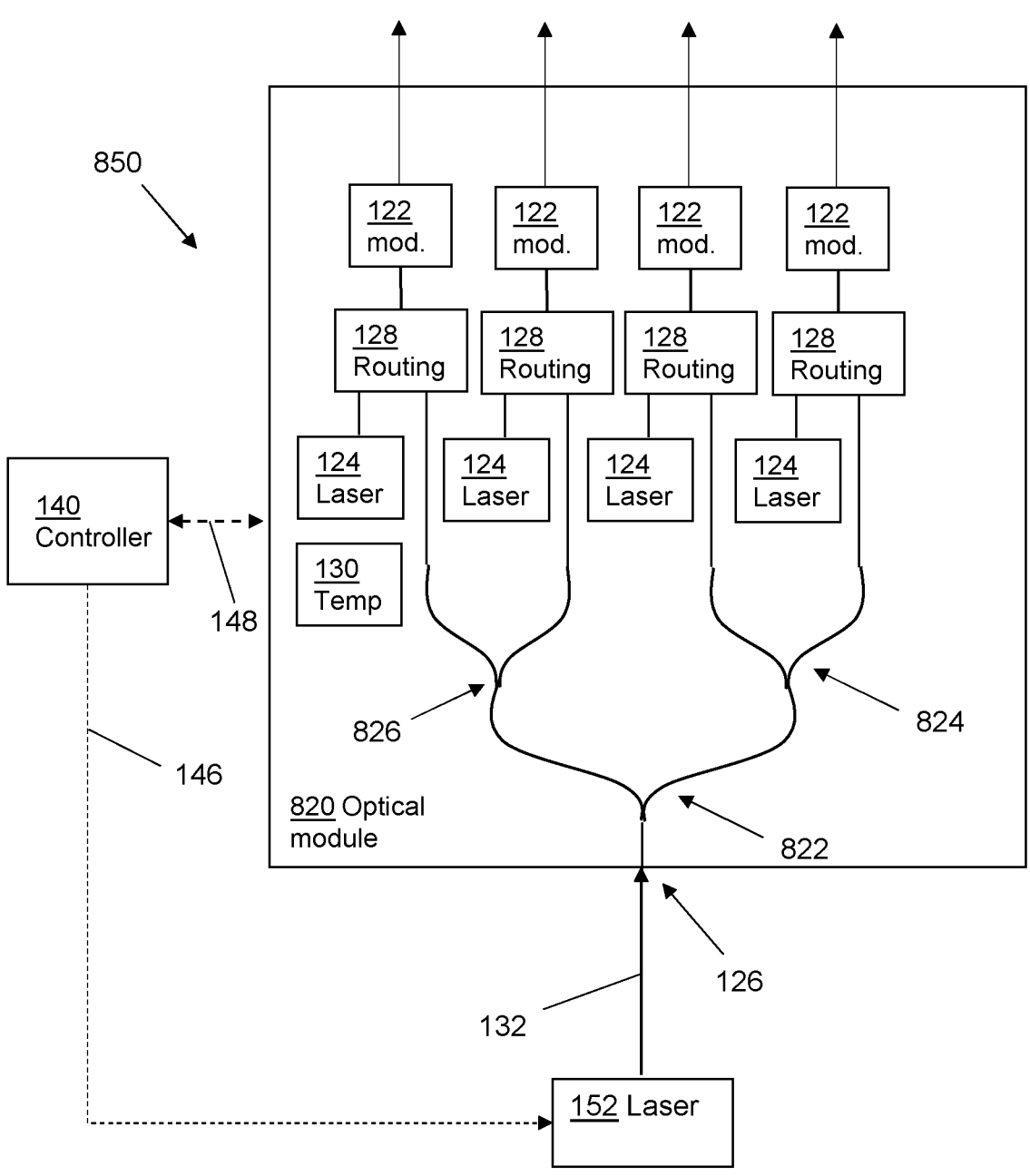

In an embodiment, illustrated in FIG. 10, the communications network optical apparatus 850 further comprises an external laser 152 arranged to generate the external optical signal 132.

Figure 11:
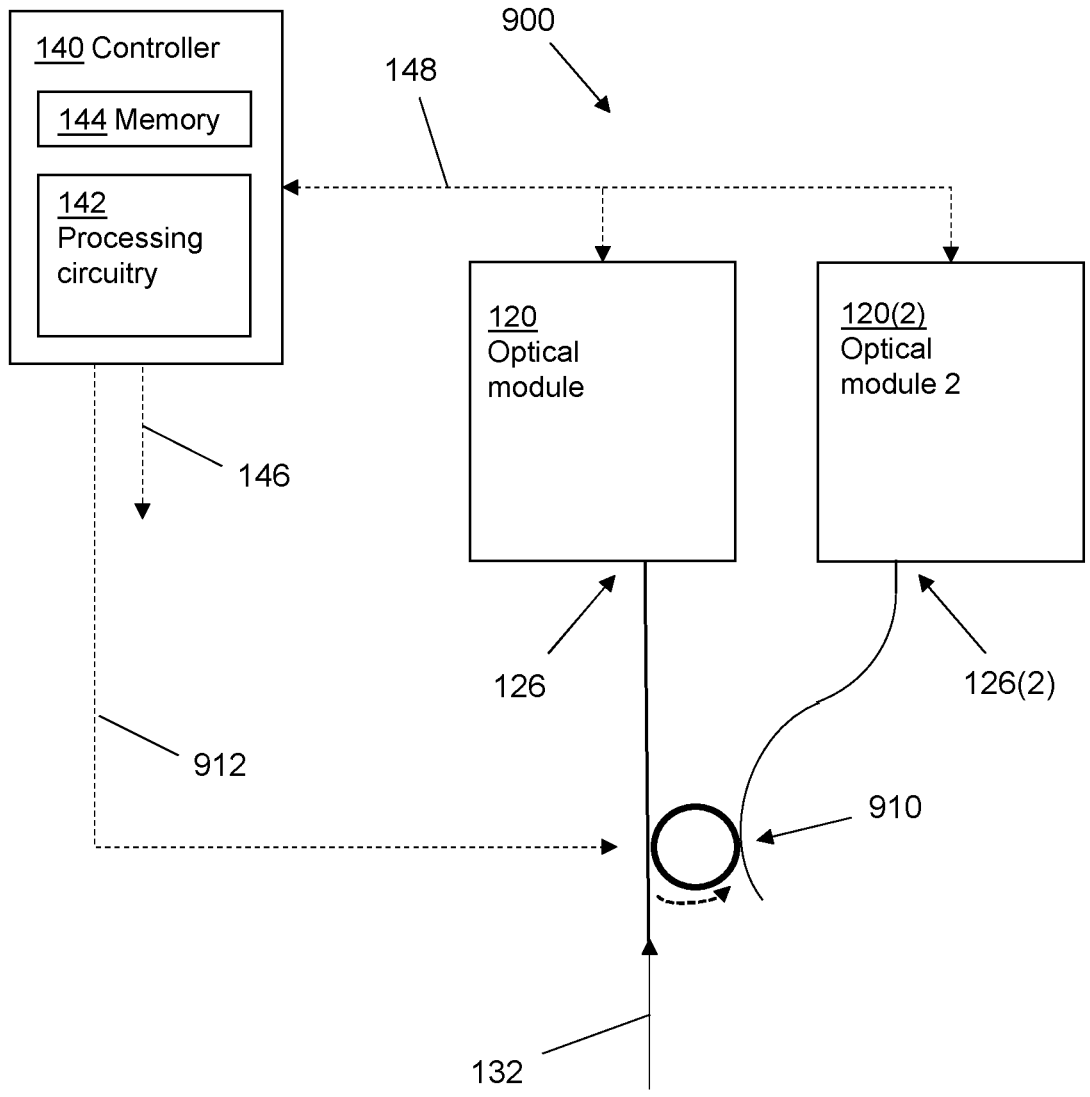

In an embodiment, illustrated in FIG. 11, the communications network optical apparatus 900 comprises two optical modules-optical module 120 and optical module two 120 (2)—and a variable power coupler 910.

The variable power coupler may, for example, be a directional coupler with thermo-optic variation of the refractive index or may be a double micro-ring coupler. The variable power coupler is configured to receive the external optical signal 132 and is configured to power split the external optical signal to send a first portion of the external optical signal to the optical module 120 and a second portion of the external optical signal to the second optical module 120(2). The external optical signal 132 can therefore be used to serve both optical modules.

The controller 140 is caused to generate a further control signal 912 to provide a control command to the variable power coupler. The control command is configured to set the percentage of received external optical signal that is routed to each of the optical modules.

The optical modules are independent, therefore a thermal protection condition may occur at different times for each module. The variable power coupler is operable to send a portion of the external optical signal to the optical module where it is needed. The external optical signal is split and distributed in a single step using the variable power coupler that acts as a switch that also regulates the percentage of laser power that passes from one waveguide to the other.

The variable coupler in this case is a variant of switch node in the switch matrix used for the routing of the light from the external laser sources towards the modules.

Figure 12:
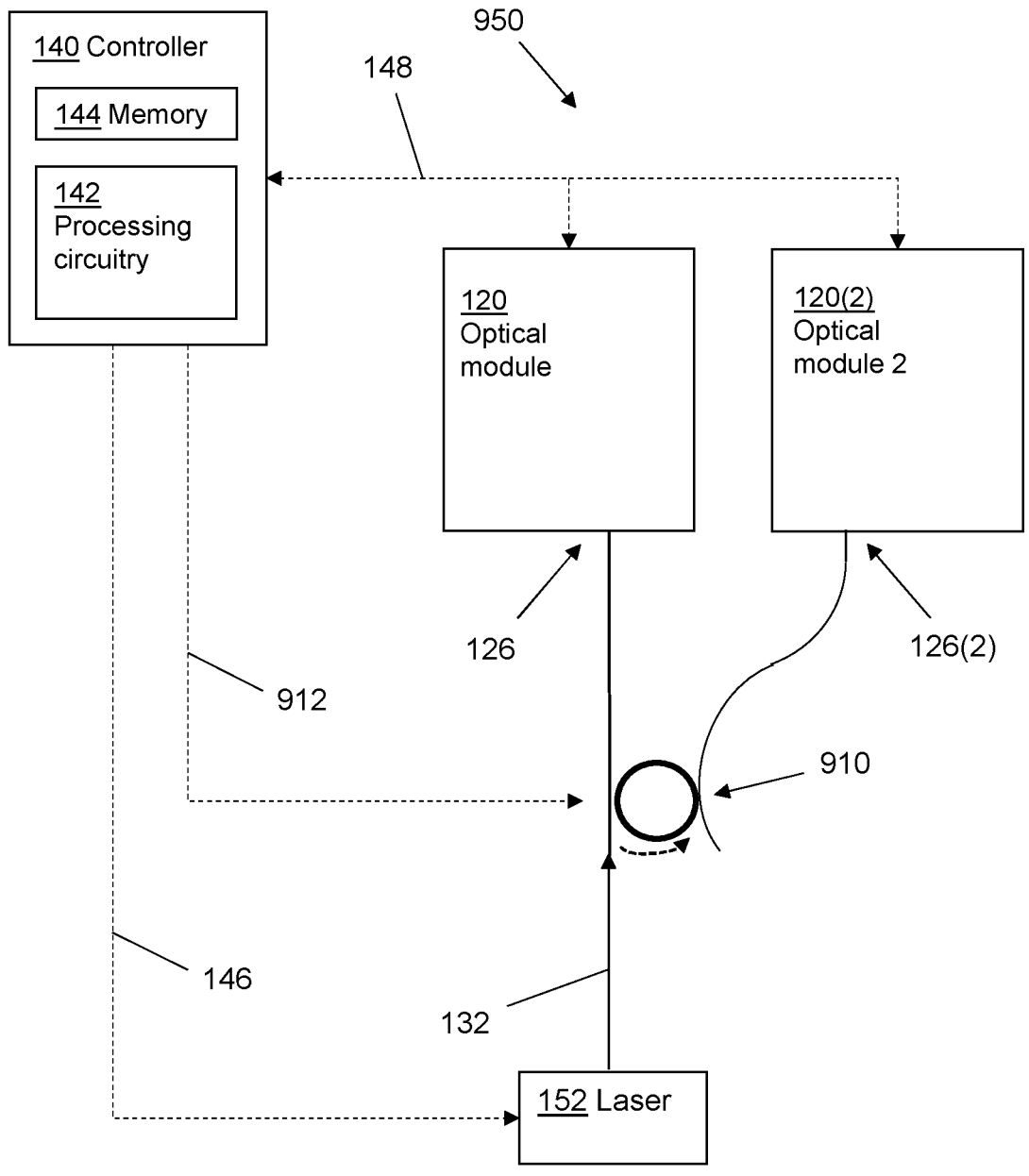

In an embodiment, illustrated in FIG. 12, the communications network optical apparatus 950 further comprises an external laser 152 arranged to generate the external optical signal 132.

For power saving purposes the laser power of the external laser 152 may be variable. The controller 140 is caused to generate the first control signal 146 to provide an operating power control command, so that the external laser 152 is configured to fulfil the power needs of the optical modules to be served. For example, if the external laser is serving only the optical module 120, the power control command is configured to cause the external laser power to be set to a first value P=p1. If, instead, the external laser is required to serve optical module 120 and optical module 120(2), the power control command is configured to cause the external laser power to be set to a higher value, P=p1+p2.

In this scenario, the controller is operable to respond to requests by simultaneously controlling the external laser power, to serve the totality of the optical modules, and configuring the variable coupler to send the required fraction of external laser power to each optical module.

In an embodiment, the controller is further operative to perform further operations including:

receiving a further temperature reporting signal from the temperature sensor 130;

determining that a thermal protection condition no longer exists based on the temperature of the internal lasers 124; and in response to said determining, generating control signals configured to stop the external optical signal 132 being provided to the at least one optical modulator 122 and to cause the reduction in the operating power of the at least one respective internal laser 124 to be reversed.

Figure 13:
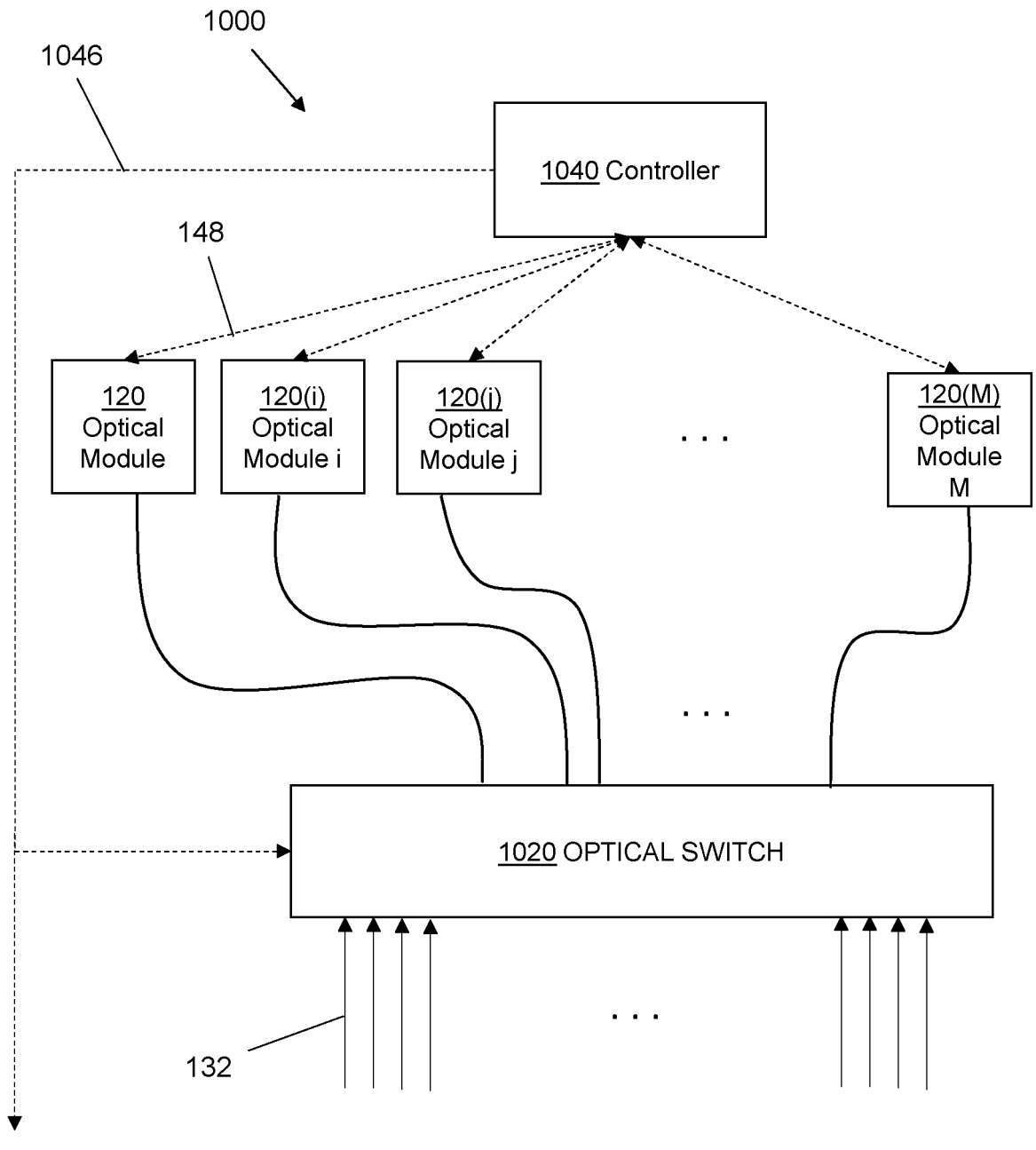

In an embodiment, illustrated in FIG. 13, the communications network optical apparatus 1000 comprises a plurality of optical modules 120 and an optical switch apparatus 1020.

The optical switch apparatus is configured to receive a plurality of external optical signals 132.

The controller 1040 is operative to receive temperature reporting signals from the optical modules 120 and to determine that a thermal protection condition exists at an optical module based on the temperature of its internal lasers 124. The control signals are further configured to cause the optical switch apparatus to route one of the external optical signals to the optical module having the thermal protection condition. It will be understood that a thermal protection condition may exist at more than one optical module at the same time and the control signals are configured to cause the optical switch apparatus to route a respective external optical signal to each optical module at which a thermal protection condition exists.

Figure 14:
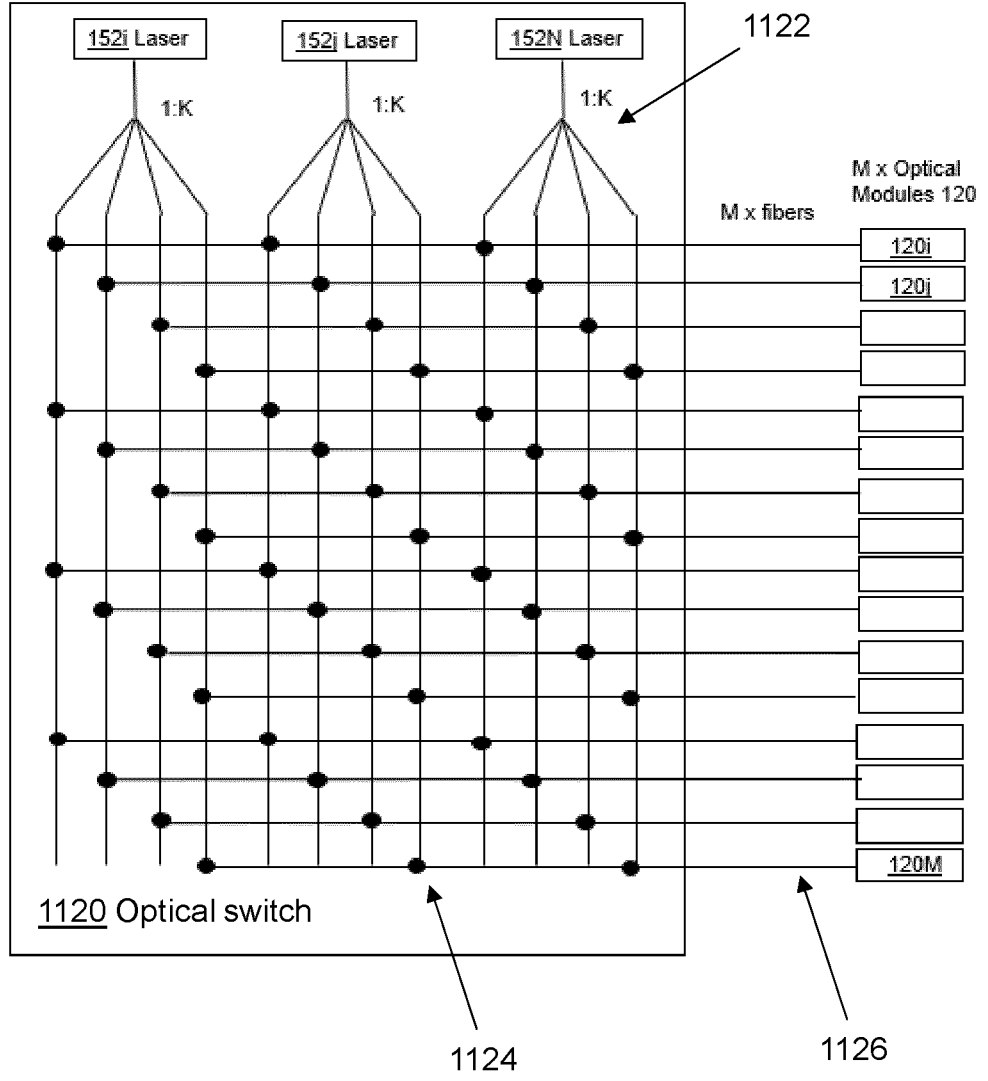
FIGS. 14 and 15 are block diagrams illustrating optical switches of embodiments of communications network optical apparatus.

FIG. 14 illustrates the logical scheme of an optical switch apparatus 1120, external lasers 152 and optical modules 120 of a further embodiment of communications network optical apparatus similar to the apparatus 1000 illustrated in FIG. 13.

The optical switch apparatus 1120 is configurable to conditionally connect a set of N external lasers 152 to M optical modules 120. The optical switch apparatus 1120 comprises a plurality of optical switch nodes 1124 which may be configured to route an external optical signal from an external laser 152 to an optical module 120. A 1:K optical splitter 1122 is provided between each external laser 152 and the optical switch nodes, to power split the external optical signal from each external laser 152. A high power external laser may therefore be used to service a variable number (from 1 to k; k=4 in this example) optical modules.

The outputs of the optical switch apparatus are connected to the M optical modules 120 by M optical fibers 1126.

Figure 15:
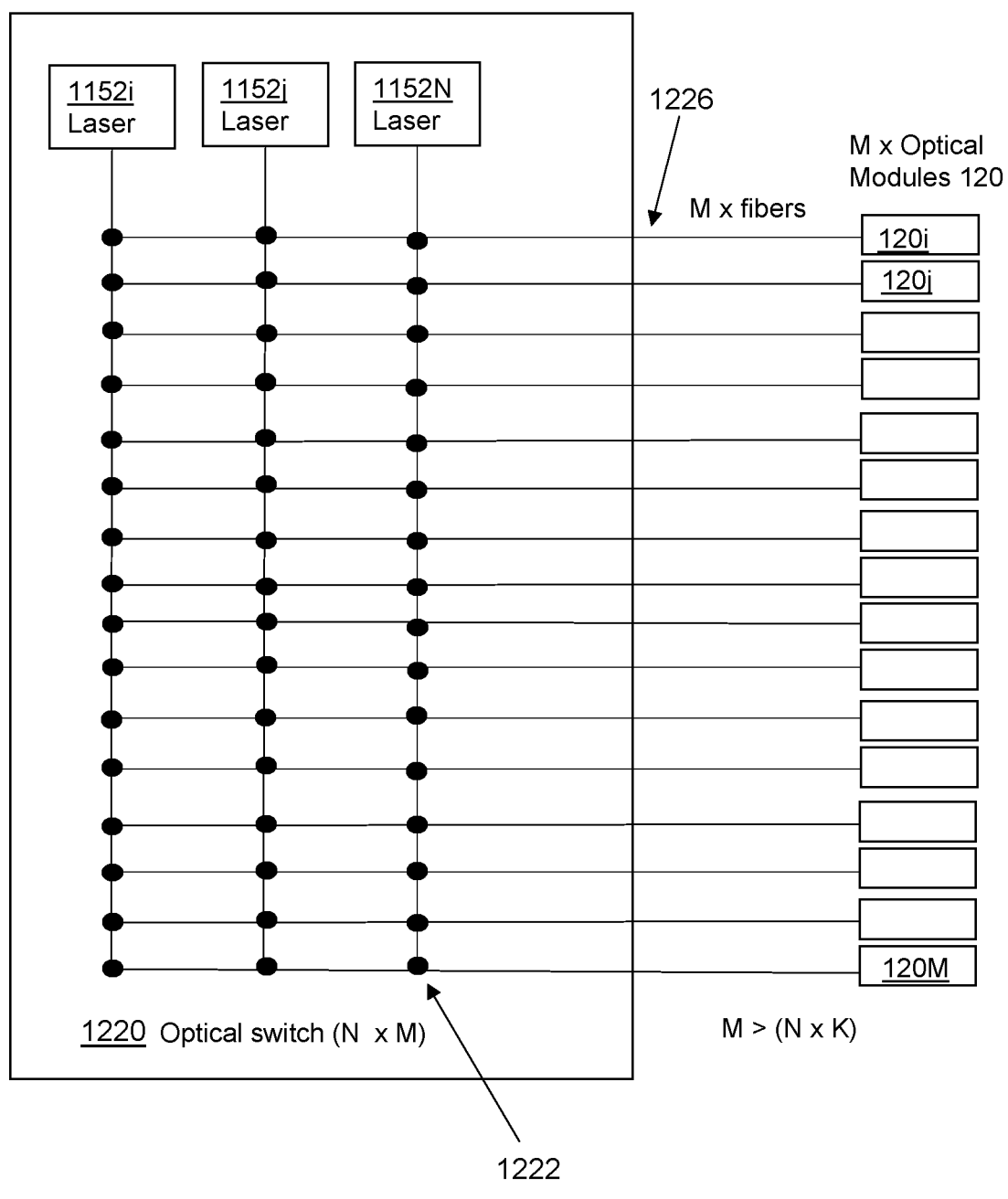

FIG. 15 illustrates the logical scheme of an optical switch apparatus 1220, external lasers 152 and optical modules 120 of a further embodiment of communications network optical apparatus similar to the apparatus 1000 illustrated in FIG. 13.

The optical switch apparatus 1220 is configurable to conditionally connect a set of N variable power external lasers 1152 to M optical modules 120. The optical switch apparatus 1220 comprises a plurality of optical switch nodes 1222 which may be configured to route an external optical signal from an external laser 1152 to an optical module 120. Each optical switch node 1222 is configurable to route a portion of an external optical signal received from a respective external laser 1152 to a respective optical module 120. A variable power external laser may therefore be used to service a variable number of optical modules. Up to K optical switch nodes may be activated at the same time.

The outputs of the optical switch apparatus are connected to the M optical modules 120 by M optical fibers 1126.

In an embodiment, an optical module 120 is a co-packaged optics, CPO, optical module.

In an embodiment, an optical module 120 is provided in a Radio Unit of a communications network. The typical scenario where a laser undergoes thermal stress for a limited time in proportion with the total time of operation, is found in the application of co-packaged optical transceivers in Radio Units that are part of a mobile radio base station. In a Radio Unit typically there is no forced ventilation for cooling; the operating temperature is dependent on the environment temperature and is directly related to the power dissipation of the unit.

While instantaneous traffic at a Radio Unit changes within milliseconds, the temperature of the equipment can be considered related to average traffic in downlink due to thermal inertia of the Radio Unit, that can be assumed to be in the range of tens to hundreds of seconds order of magnitude, depending on the size of the Radio Unit. Traffic load typically varies during the day, with one or two peak hours within the 24 hours.

Figure 16:
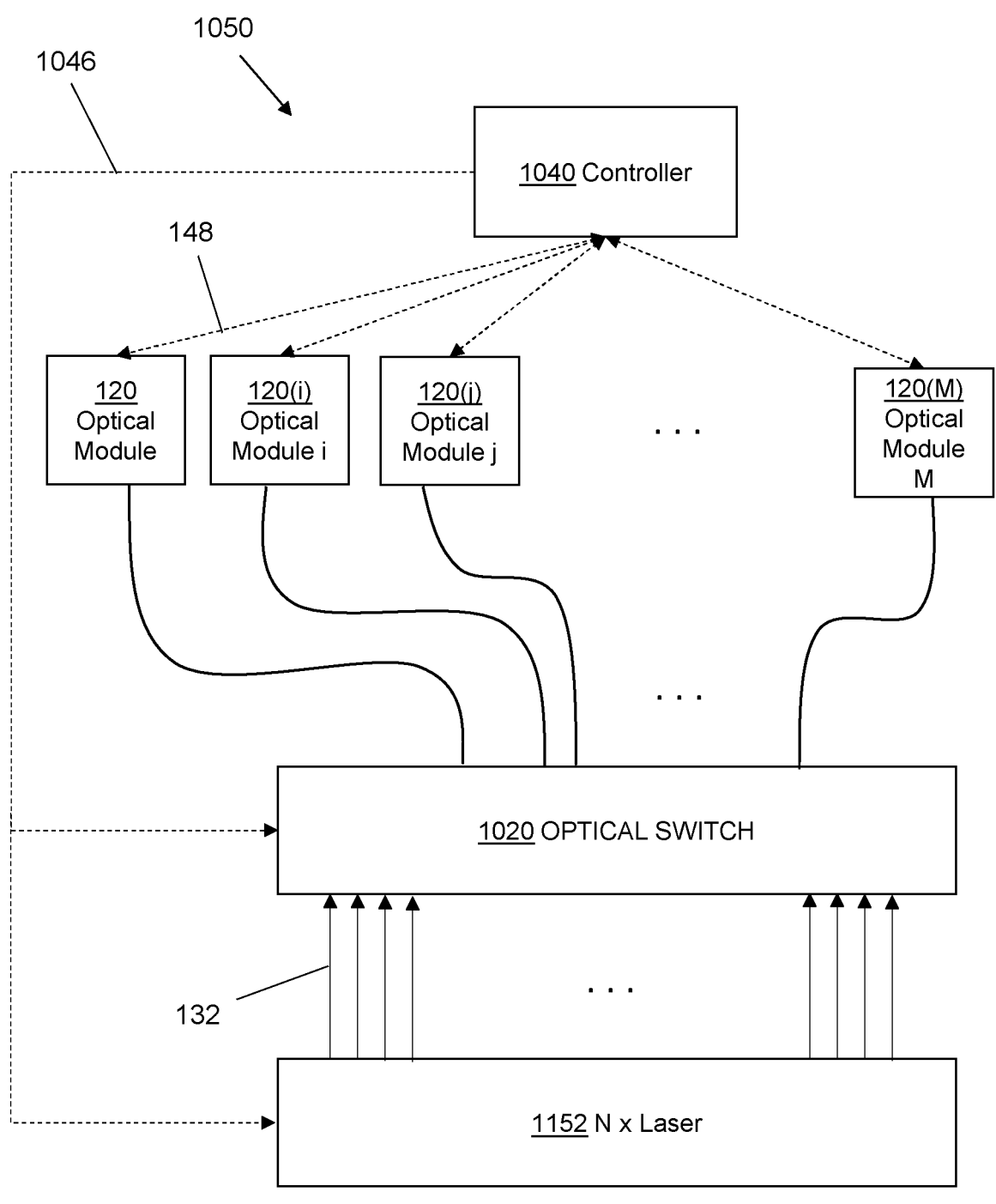

In an embodiment, illustrated in FIG. 16, the communications network optical apparatus 1050 further comprises a pool of N external lasers 1152 arranged to generate the external optical signals 132.

In an embodiment, the external lasers 1010 and the optical switch apparatus 1020 are located remote from the optical modules 120.

In an embodiment, each of the optical modules 120 comprises a plurality of internal lasers 124, one or more of which may be handed over to an external optical signal when a thermal protection condition exists.

The controller 1040 is caused to perform operations to control handover from an internal laser 124 to an external laser 1152 and subsequent off of the internal laser. The handover comprises the following functions:

a. delivery of an external optical signal 132 to at least one optical modulator 122 of an optical module 120 where a thermal protection condition exists b. Exclude and switch off the respective internal laser The controller 1040 is caused to perform operations including:

a. determining that a thermal protection condition exists at an optical module b. select the most convenient external laser 1152 in the pool of N external lasers c. activate a set of optical switch nodes to deliver the external optical signal to the optical module d. manage the handover between the internal laser 124 and the external laser 152

The choice of external laser may be based on criteria including, for example: distance, power, and operating wavelength. The external lasers may be located in proximity to the optical modules (from some cm to meters) or very far in a remote location up to km away from the optical modules to be served. In the first case the external laser could be connected to the module via a polarization maintaining fiber, so to avoid addressing polarization diversity in the photonic chip of the module. For long distances instead, polarization agnostic laser sources are preferable, such as the remote laser source described in U.S. Pat. No. 10,014,943B2.

The pool of external lasers provides a number of external sources N to a set of M optical modules 120 via switching of optical switch nodes of the optical switch apparatus 1020. The choice of N and M depends on the statistics of the protection condition and the number of internal lasers in each optical module. The response of the optical switch apparatus is not time-critical, since the handover will not take place until the external optical signal has reached the optical module.

There are different options for the choice of the type of external lasers 1152: the external lasers can be a high-power laser, that can be split to serve many optical channels (i.e. optical modulators) or a low power laser to serve a single channel.

In the case of a high-power external laser provides a high power external optical signal to replace multiple internal optical signals in the same optical module 120, since all of the internal lasers 124 will suffer a similar thermal stress, the external laser can be switched on following detection of the thermal protection condition. In the case where the external laser serves more than one optical module extra controls are needed to deliver the required optical power to each optical module independently. These controls may include the external laser power variation and variable optical power splitting described above.

In the case of the use of low power external lasers the control is simpler as the external optical signal can be simply routed towards the respective optical modulator of a single optical channel and switched off when not in use.

In both cases, the external laser may be a wavelength tunable laser to increase flexibility.

The handover from an internal optical signal generated by an internal laser to an external optical signal generated by an external laser is performed such that the optical power input to the respective optical modulator is maintained, with a preference towards a slight increase of optical power in the case of a gradual power up of the external laser or when the internal laser switch off and external laser switch on cannot be synchronized and symmetric.

The controller 1040 is caused to generate control signals to switch from/to the use of the light of the external source and the internal laser gradually, with a co-existence of the two light inputs to feed the optical transmitter, or to exclude the internal laser at the inset of the external laser. These two approaches, gradual handover and switched handover, have different advantages and drawbacks as explained in the following, and the convenience of one over the other may depend on the use case.

For the case where the handover is gradual, the apparatus 1050 may exploit known control systems used to control the average optical power output by an optical module. For example, automated power control loops that change the bias current of the internal laser 124 in response to the light power received from a monitor photodiode, e.g. where the bias current is changed to maintain the photo-diode current. This type of control is generally present in optical modules to compensate for temperature variation and aging of the laser.

The controller 1040 may be caused to perform operations including:

receiving a temperature reporting signal;

determining that a thermal protection condition exists at an optical module based on the temperature of the internal lasers;

selecting an external laser 1152 of the pool of N external lasers to replace an internal laser of the optical module; and generate a first control signal to send a 'switch on' control command to the selected external laser, to cause the external laser to gradually switch on, the light from the external laser merging with the internal optical signal in the optical routing device 128, 400, 500, 600;

The optical tap 408, 510, 612 within the optical routing device 400, 500, 600 sends a % of light to a monitor photodiode that detects the light intensity increase caused by the merging of the external optical signal with the internal optical signal. The controller 1040 is further caused to general a second control signal comprising power control commands to cause a decrease of the bias current of the internal laser in response to the photodiode signal.

In an embodiment, the M optical modules 120 are provided within a cluster of Radio Units, sharing the pool of N external lasers 1152. The external lasers are connected to the Radio Units with optical fibers of up to 2-3 Km of length.

Referring to FIG. 17, an embodiment provides a method 1400 of providing optical signals for an optical module in a communications network.

The method comprises steps of:

generating 1402 an internal optical signal at an internal laser of the optical module;

providing 1404 the internal optical signal to an optical modulator of the optical module for optical modulation;

monitoring 1406 a temperature of the internal laser;

determining 1408 that a thermal protection condition exists based on the temperature of the internal laser; and in response to the determining, causing 1410 an external optical signal to be provided to the optical modulator and causing an operating power of the internal laser to be reduced.

The invention claimed is:

1. An optical apparatus configured to operate in a communications network, the optical apparatus comprising:

an optical module comprising:

internal lasers arranged to generate optical signals internal to the optical module, optical modulators arranged to modulate the internal optical signal, an input port arranged to receive an external optical signal from an external laser, and optical routing devices arranged to route the internal optical signals from the internal lasers to the optical modulators, and to route the external optical signal from the input port to at least one of the optical modulators;

a temperature sensor arranged to sense a temperature of the internal lasers and to generate a temperature reporting signal indicative of the temperature of the internal lasers; and a controller comprising processing circuitry and memory containing instructions executable by said processing circuitry whereby said controller is operative to:

receive the temperature reporting signal, determine that a thermal protection condition exists based on the temperature of the internal lasers, as indicated by the temperature reporting signal, and in response to the determining, generate control signals configured to cause the external optical signal to be provided to at least one optical modulator and to cause an operating power of at least one respective internal laser to be reduced.

2. The optical apparatus of claim 1, wherein:

the control signals comprise a first control signal for providing power control commands to an external laser and a second control signal for providing power control commands to the at least one internal laser; and the controller is further operative to:

generate the first control signal to provide a power-on control command to the external laser in response to the determining that the thermal protection condition exists; and subsequently generate the second control signal to provide at least one power control command configured to cause the operating power of the at least one respective internal laser to be reduced.

3. The optical apparatus of claim 1, wherein the control signals are configured to cause the operating power of the at least one respective internal laser to be reduced by one of the following: switching off the operating power, gradually reducing the operating power and then switching off the operating power, or gradually reducing the operating power to zero.

4. The optical apparatus of claim 2, wherein:

the optical module further comprises an optical tap configured to route a portion of the external optical signal received at the input port to the at least one respective internal laser for injection locking the at least one internal laser with the external optical signal; and the second control signal is generated subsequent to the injection locking.

5. The optical apparatus of claim 1, wherein the external optical signal has a first frequency and the internal optical signals have frequencies that differ from the first frequency by more than a defined detection bandwidth.

6. The optical apparatus of claim 2, wherein:

the optical routing devices include the following:

a first optical waveguide coupled to an optical modulator, a second optical waveguide coupled to an internal laser, a third optical waveguide coupled to the input port, and at least one directional phase-shifting coupler for coupling the second optical waveguide to the first optical waveguide or the third optical waveguide to the first optical waveguide; and the controller is further operative to generate a third control signal after generating the first control signal, wherein the third control signal includes control commands that cause:

the at least one directional phase-shifting coupler to couple the internal optical signal into the first optical waveguide with a first phase;

the at least one directional phase-shifting coupler to stop coupling the internal optical signal into the first optical waveguide; and the at least one directional phase-shifting coupler to couple the external optical signal into the first optical waveguide with the first phase.

7. The optical apparatus of claim 6, wherein the third control signal also includes control commands that cause:

the at least one directional phase-shifting coupler to gradually reduce to zero the coupling of the internal optical signal into the first optical waveguide; and the at least one directional phase-shifting coupler to gradually increase the coupling of the external optical signal into the first optical waveguide with the first phase.

8. The optical apparatus of claim 1, wherein:

the optical routing devices comprise an all-optical switch having a first input connected to an internal laser, a second input connected to the input port, and an output connected to an optical modulator;

the optical module further comprises an optical tap configured to route a portion of the external optical signal received at the input port of the optical module to the all-optical switch as a switching signal for the all-optical switch;

the all-optical switch has a first switch condition in which the first input is connected to the output and a second switch condition in which the second input is connected to the output; and the all-optical switch is arranged to switch from the first switch condition to the second switch condition responsive to receipt of the switching signal.

9. The optical apparatus of claim 8, wherein the all-optical switch is arranged to switch between the first switch condition and the second switch condition with a switching time less than 10 picoseconds.

10. The optical apparatus of claim 1, further comprising:

a second optical module, and a variable power coupler configured to:

receive the external optical signal from the external laser; and power split the external optical signal to send a first portion of the external optical signal to the optical module and second portion of the external optical signal to the second optical module.

11. The optical apparatus of claim 1, wherein the controller is further operative to:

receive a further temperature reporting signal including a further temperature of the internal lasers;

determine that the thermal protection condition no longer exists based on the further temperature of the internal lasers; and in response to the determination that the thermal protection condition no longer exists, generate control signals configured to stop the external optical signal from being provided to the at least one optical modulator and to cause the reduction in the operating power of the at least one respective internal laser to be reversed.

12. The optical apparatus of claim 1, wherein:

the apparatus comprises a plurality of optical modules;

the controller is further operative to:

receive temperature reporting signals from the plurality of optical modules, each temperature reporting signal indicating a temperature of an internal laser of the optical module from which it is received, and determine that the thermal protection condition exists at one of the optical modules based on the temperature of its internal lasers, as indicated by the temperature reporting signal received from the optical module; and the control signals are further configured to cause an optical switch apparatus to route one of the external optical signals to the optical module for which the thermal protection condition is determined.

13. The optical apparatus of claim 12, further comprising the optical switch apparatus configured to receive a plurality of external optical signals.

14. The optical apparatus of claim 12, wherein:

the external optical signals include a plurality of optical signals generated by a respective plurality of external lasers, and the plurality of external lasers and the optical switch apparatus are located remote from the plurality of optical modules.

15. The optical apparatus of claim 1, further comprising at least one external laser arranged to generate the external optical signal received by the input port.

16. The optical apparatus of claim 1, wherein an optical module is a co-packaged optics (CPO) module.

17. A radio unit comprising the optical apparatus of claim 1.

18. A method of providing optical signals for an optical module in a communications network, the optical module comprising an internal laser and an optical modulator, the method comprising:

generating an internal optical signal by the internal laser;

providing the internal optical signal to the optical modulator for optical modulation;

monitoring a temperature of the internal laser;

based on the monitoring, determining that a thermal protection condition exists for the internal laser; and in response to determining that the thermal protection condition exists, causing an external optical signal to be provided to the optical modulator and causing an operating power of the internal laser to be reduced.

\* \* \* \* \*